Oct. 15, 1963    C. W. SMITH    3,107,133
ELECTRICAL DISTRIBUTION DEVICE AND METHOD OF MANUFACTURE
Filed March 30, 1959    2 Sheets-Sheet 1
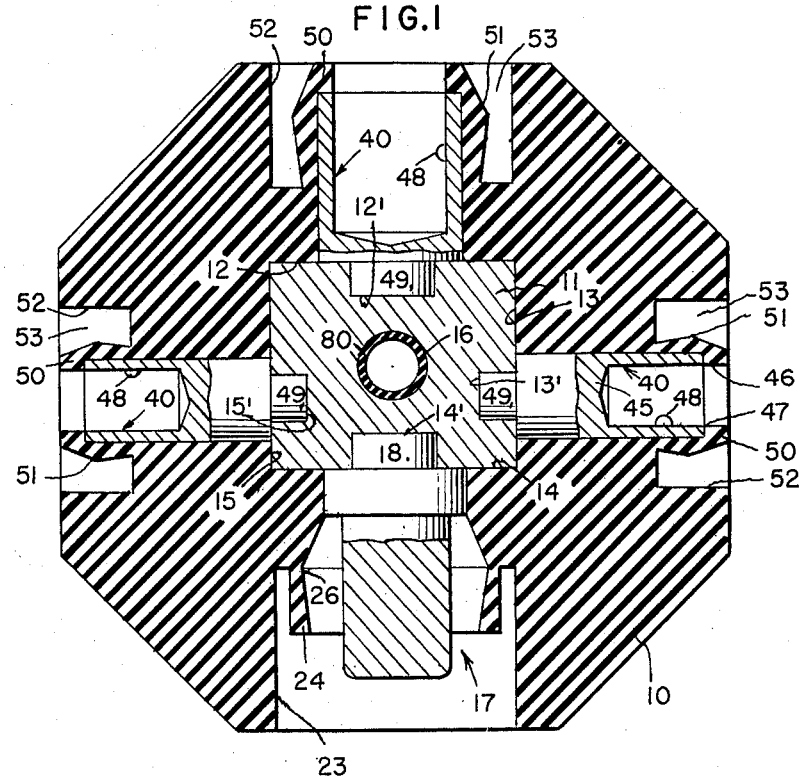
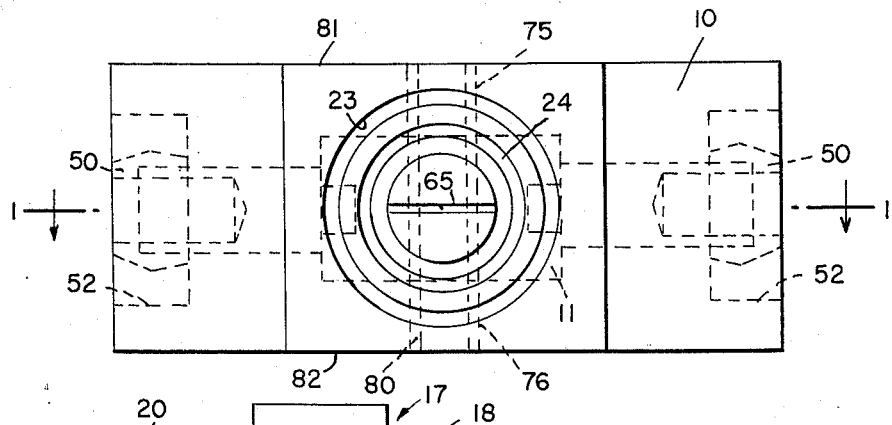
INVENTOR.
Charles W. Smith
BY
Shoemaker & Mattare
ATTYS.

Oct. 15, 1963  C. W. SMITH  3,107,133
ELECTRICAL DISTRIBUTION DEVICE AND METHOD OF MANUFACTURE
Filed March 30, 1959  2 Sheets-Sheet 2
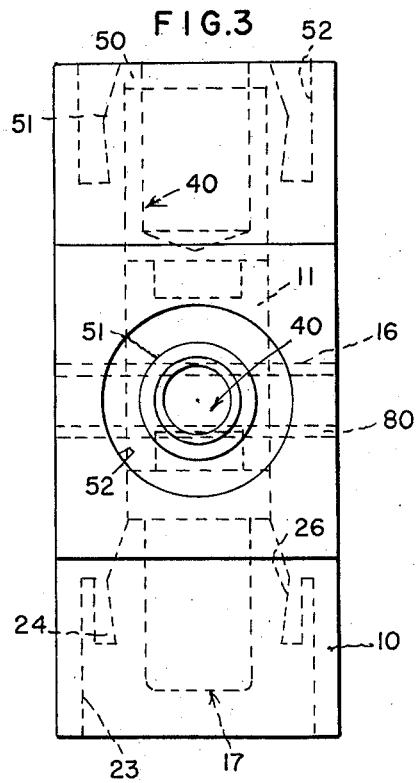
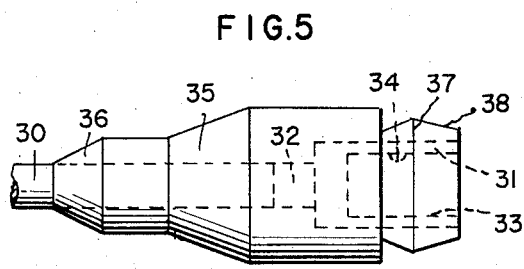
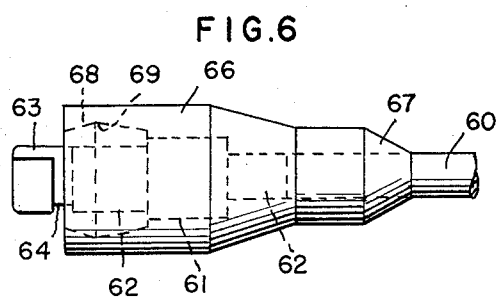
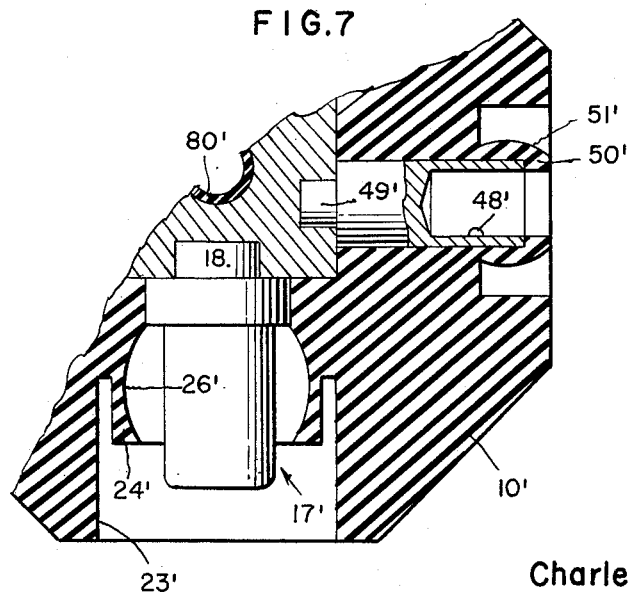
INVENTOR.
Charles W. Smith
BY
Shoemaker & Mattare
ATTYS.

3,107,133
ELECTRICAL DISTRIBUTION DEVICE AND
       METHOD OF MANUFACTURE
Charles W. Smith, Hamlet Hill, Salisbury, Conn.
    Filed Mar. 30, 1959, Ser. No. 802,976
          8 Claims. (Cl. 339—60)

The present invention relates to a new and novel electrical distribution device, and more particularly to a distribution device providing a very compact arrangement including an electrical inlet and a plurality of electrical outlets whereby the electrical energy from a single source may be distributed to a plurality of locations.

The present invention is particularly adapted for use in constant potential multi-operator welding systems. This type of system has, in recent years, become more and more popular particularly in connection with shipbuilding operations wherein an extensive amount of welding is required in a plurality of widely spaced locations. The development of semi-conductor rectifier elements has made such constant potential welding systems practical.

Multi-operator welding systems are advantageous because they provide highest welding quality while having a lower initial cost than single operator welders, and maintenance is reduced to a minimum. Multi-operator systems are quite compact and highly portable and, in general, have a long life expectancy and may be utilized in many various applications, thereby providing the highest degree of versatility in welding operations. Such multi-operator welding systems are generally economically feasible with a minimum of approximately twenty arcs, and of course the more arcs which are required, the greater the efficiency and economy of a constant potential multi-operator system. This type of system is also especially well suited for use where the amount of space is limited and a concentration of arcs is required in a particular area.

An important and fundamental concept of multi-operator welding systems is the fact that many arcs are operated in parallel utilizing what is known as the "diversity factor." By use of parallel operation, the inherent flexibility of the system results in an appreciable gain in the number of welding arcs and a resultant lower cost per arc. The so-called "diversity factor" is the distribution or diversity of the welding load on the equipment between the welding operators at any time. The welding duty cycle, or the time when a particular arc is actually being used for welding, is not continuous, and in fact it is extremely difficult for a welder to attain as much as a 50% duty cycle over any extended period of time, or in other words, the welding arc would not be employed more than 50% of the time. It is evident that a certain amount of time is required for the welder to set up the work and replace the electrodes and so forth, thereby as a practical matter making it impossible for the welder to be employing the welding arc at all times. Actual tests and checks in many industries on all kinds of production welding have shown that a 25% duty cycle is about average on manual coated electrode welding, thereby indicating that the welding arc is employed by each individual welder only approximately 25% of the time.

The constant potential multi-operator system takes into account the 25% normal duty cycle and also the fact that a plurality of operators, for example thirty in number, operating from a single power source will not be welding at the same time. This second fact is the load distribution factor or the diversity factor. The duty cycle and diversity factor accordingly permit a large number of operators to successfully conduct welding operations from a single source of power in an expeditious manner. As mentioned previously, this type of operation is quite practical for shipbuilding, and is also well suited for use in central station power plant constructions or oil refinery and oil storage tank construction or erection, or in large boiler and pipe jobs.

In order to successfully obtain the desired parallel operation, it is necessary to provide electrical distribution devices which have an inlet and include a plurality of outlets from which many different individual welders may operate. The present invention provides such an electrical distribution device, and incorporates a novel construction wherein a body means is formed of molded rubberlike material having embedded therein electrical inlets and outlets interconnected to one another by a suitable bus bar embedded in the body means. Each of the electrical inlets and outlets is surrounded by an integral portion of the body means provided with a reverse tapered surface for engaging a correspondingly tapered member when a cable is attached to the invention device.

The present invention provides a very compact and adaptable arrangement whereby an electrical inlet is provided and a relatively small number of electrical outlets are connected therewith. For example, a single electrical inlet and three electrical outlets are provided in a typical construction. An important feature of the present invention is the method of manufacture thereof and the adaptability for different load requirements. For example, the load conditions may vary with different projects, and the utilization of the device as a distribution center may vary from place to place. It is accordingly desirable to provide a construction and method of manufacture which permits easy production of distribution devices including different sized inlets and outlets. With the novel arrangement according to the present invention, different sized electrical inlets and outlets can be readily utilized.

A core is provided, the core being originally of a block of electrically conductive material, and after determining the desired size of the electrical inlet and outlet means, the core may simply be cut to the necessary size. Depressions are then formed in the faces of the core, and the inlet and outlet means are then fitted within these depressions. An integral body of electrical insulating material is then molded in surrounding relationship to the core, and the inlet and outlets. It is apparent that the size of the core as well as the spacing of the inlet and outlet means in the depressions formed in the core can be readily adjusted during manufacture to obtain the desired results.

This over-all construction provides a very compact and strong arrangement which serves to resist damage or deformation during use even if accidentally dropped or mishandled.

An additional important feature of the invention is the provision of an opening formed completely through the core and a pair of aligned openings formed in the body means on opposite sides of the core. A sleeve of insulating material is disposed within these aligned openings thereby providing a completely insulated opening through the device through which a chain or rope and the like may be inserted for facilitating handling of the device and also permitting easy mounting of the device in any desired location. This central opening through the device also facilitates cooling thereof to prevent the apparatus from overheating under heavy loads.

The electrical inlet and outlet means are recessed inwardly of the outer surface of the body means and are surrounded by reversely tapered surfaces formed integral with the body means for providing a fluid-tight connection with the end portion of a cable or the like.

The rubber-like material employed in the body means is a good electrical insulator, and is preferably of an oil resistant type so as to stand up in operation and to resist the effects of corrosive materials encountered during use.

It is apparent that a plurality of cables can extend in various directions from the device to different welding units as required. There is substantially no maintenance involved with the present invention, and the device is extremely rugged in construction and may be quickly and easily attached to or removed from cables.

An object of the present invention is to provide a new and novel electrical distribution device which provides a compact arrangement for distributing electricity to a plurality of locations from a central point.

Another object of the invention is the provision of an electrical distribution device which is well insulated and highly oil resistant, and which is very rugged in operation.

A further object of the invention is to provide an electrical distribution device wherein the weight is substantially reduced and which is easy to handle and further wherein the cooling of the components thereof is facilitated.

Yet another object of the invention is to provide an electrical insulation device wherein the inlet and outlets are protected from damage, and which is quite simple and inexpensive in construction.

A still further object of the invention is to provide a new and novel method of manufacturing an electrical distribution device which is very adaptable and permits ready manufacture of devices having different sized inlets and outlets.

Other objects and many attendant advantages of the present invention will become more apparent when considered in connection with the accompanying specification and drawings wherein:

FIG. 1 is a sectional view taken along line 1—1 of FIG. 2, looking in the direction of the arrows;

FIG. 2 is an elevation of the device shown in FIG. 1;

FIG. 3 is a side view of the device shown in FIG. 1;

FIG. 4 is an enlarged view of one of the inlet connectors of the apparatus;

FIG. 5 is a view of a cable end employing a female connector adapted to cooperate with the male connector of the device;

FIG. 6 is a view of a cable end employing a male connector adapted to fit within the female connectors of the device, and FIG. 7 is a cut-away sectional view similar to FIG. 1 showing a portion of a modified electrical distribution device according to the invention.

Referring now to the drawings wherein like reference characters designate corresponding parts throughout the several views, a body means 10 is shown having a substantially octagonal plan view configuration and being formed of molded relatively hard rubber-like material. Embedded within the central portion of the body means is an integral core 11 formed of electrically conductive material such as copper, and being shown as having four outer faces 12, 13, 14 and 15 in FIG. 1. These faces are provided with depressions 12', 13', 14' and 15' formed in faces 12, 13, 14 and 15 respectively, and a circular opening 16 is formed through the central portion of the core 11.

A male connector member indicated generally by the reference numeral 17 is provided with an end portion 18 which is fitted tightly within the depression 14' in face 14 to provide an electrical interconnection between inlet means 17 and the core 11. As seen most clearly in FIG. 4, member 17 includes a substantially cylindrical portion 20 having a cut-out flattened portion 21 extending along the axis of the member and connected at the inner end thereof with a circumferentially extending slot 22 which extends partially around the outer periphery of cylindrical portion 20. Inlet means 17 is disposed within a substantially cup-shaped recess 23 formed in the outer surface of body means 10, the body means including a substantially annular flexible shoulder member 24 spaced from the inner surface of recess 23 and disposed in surrounding relationship to inlet means 17. The inner surface of shoulder 24 cooperates with an adjacent surface formed integral with the body means to define a reversely tapered surface 26 for cooperating with a correspondingly reversely tapered surface secured to the end of a cable for providing a water-tight seal with the end of the cable.

Referring now to FIG. 5, a cable 30 has secured to the outer end thereof a metallic connector 31 having a reduced hollow thimble portion 32 which is crimped upon the outer end of the cable for securely fastening the connector thereto. Metallic connector 31 defines a cylindrical recess 33 having a substantially hemispherical projection 34 extending radially into the recess. An insulating sleeve 35 surrounds the outer end of the cable and has the rear portion 36 secured to the cable as by vulcanizing or the like to provide a permanent seal and interconnection therebetween. The forward end of sleeve 35 is provided with a reduced portion 37 having a reversely tapered outer surface 38 of complementary configuration to the reversely tapered surface 26 of portion 25 surrounding inlet 17 of the electrical distribution device.

When it is desired to connect a suitable electrical cable 30 to inlet 17, the reduced end portion 37 of the sleeve 35 surrounding the cable is inserted within recess 23 in the body means and within annular shoulder 24 to provide the desired seal. Projection 34 is adapted to travel along cut-out portion 21 of the inlet, and then upon rotation of the cable end with respect to the inlet, projection 34 rides up within circumferential slot 22 of the inlet to provide a positive interconnection therebetween for preventing the cable from becoming disconnected from the inlet. The inlet cable can be connected to any suitable source of electrical energy, and may, for example, be connected to a constant potential source such as provided with a transformer and rectifier arrangement.

Referring again to FIG. 1, a plurality of electrical outlets are connected to the core in association with each of the depressions provided in the core, each of the electrical outlet means being indicated generally by reference numerals 40. Each of these electrical outlets is embedded within the body means and they are of substantially the same configuration, the only difference being in the relative dimensions thereof.

Each of the outlets 40 comprises a metallic connector 45 having a cylindrical recess 46 formed therein, the outer end 47 of the various connector members terminating at a point disposed inwardly of the outer surface of the body means. A substantially hemispherical projection 48 is formed on the inner wall of each of recesses 46 and extends radially therein. Each of connectors 45 is provided with a reduced end portion 49 which is fitted within the corresponding depressions formed in the core. While each of the inlet and outlet means are disclosed as being mounted frictionally within depressions in the core, they may also be silver soldered to the core in order to provide a better connection therewith.

Each of connectors 45 of the outlets is surrounded by an integral portion 50 of the body means having a reversely tapered outer surface 51 adapted to cooperate with a correspondingly reversely tapered surface on the end of a cable for providing a fluid tight seal therewith. A substantially cylindrical wall portion 52 of the body means is spaced from the reversely tapered surface 51 and defines an annular recess 53 therebetween adapted to receive the insulating sleeve connected to the cooperating cable.

Referring now to FIG. 6, a cable 60 has a metallic connector 61 secured to the outer end thereof by means of a reduced thimble portion 62 formed integral with the connector and crimped to the outer end of the cable. Connector 61 includes a reduced cylindrical portion 62, the forward end of which is provided with a cut-out flattened portion 63, the rear end of which is in communication with a circumferentially extending slot 64 extending partially around reduced portion 62. It is apparent that the outer end portion of metallic connector 61 is similar to the outer end portion of connector 17 as seen most clearly in FIG. 4. In addition to the aforedescribed structure, the outer end portion of inlet 17 as well as the outer end portion of the connectors 61 secured to the cables are provided with a diametrically extending slot indicated by reference numeral 65 as seen in FIG. 2 which illustrates the end portion of inlet 17. These diametrically extending slots provide resilience for the outer end portions of the inlet and cable connectors such that they are adapted to be slightly compressed toward one another to provide a tight frictional fit with the cooperating female member.

Referring again to FIG. 6, the outer end of the cable 60 and the connector 61 are surrounded by an insulating sleeve 66, the rear end 67 of which is connected to the outer insulation of the cable by suitable means such as vulcanizing or the like. The forward portion of sleeve 66 is provided with a central recess 68 having a reversely tapered surface 69 corresponding to the reversely tapered surface 51 or portions 50 surrounding each of the outlets. It is accordingly apparent that when it is desired to connect a cable to any one of the various outlets, a cable 60 is secured thereto by inserting reduced end portions 62 of the cable within the connectors 45 of the outlets whereby projections 48 ride along cut-out portions 63, and then upon relative rotation of the cable end and the outlets, projections 48 ride up within circumferential slots 64 in the cable connectors. At the same time, the reversely tapered outer surface 51 of portions 50 of the body means cooperates with the reversely tapered surface 69 of the sleeve 66 of the cable for providing an effective fluid tight seal therewith. In this manner, various cables may be connected to the different outlets to provide a rigid interconnection therebetween. It is apparent that when cables are connected either to the inlet or outlets of the distribution device, a very good electrical connection will be made therebetween while at the same time maintaining an effective fluid tight seal between the cable ends and the body means of the distribution device, such interconnection also being very well insulated to prevent the leakage of electricity therefrom.

It is apparent from an inspection of FIG. 1 that a large electrical outlet is provided opposite the electrical inlet, and a pair of smaller electrical outlets extend substantially normally to the electrical inlet. The size and disposition of the various inlets may be varied in accordance with the distribution requirements and it is evident that the electrical outlets may all be large or all be small, or of varying size, depending upon the power requirements at various stations to which the cables may lead from the distribution device. The smaller outlets will generally be employed for distributing current to individual welding apparatus, and obviously are not required to carry larger loads, thereby requiring smaller sized cables and correspondingly smaller sized connector means. It is evident that the device provides great versatility, since cables may be connected in many different directions to various other devices from a single central location. The body means may also be made in various other configurations, but the substantially octagonal configuration shown is quite compact and sturdy, such that the device is adapted to receive a great deal of punishment without being damaged or deformed.

As seen most clearly in FIGS. 2 and 3, a pair of openings 75 and 76 is provided in the body means on opposite sides of the core 11 and in alignment with the opening 16 provided through the core. In this manner, an opening is provided completely through the finished device. A tubular sleeve 80 formed of a suitable electrically nonconductive material is fitted tightly within the aligned openings and extends completely from the upper surface 81 to the lower surface 82 of the body means, thereby forming a completely electrically insulated opening through the device. Sleeve 80 may simply be fitted in place, or suitable means such as an adhesive substance may be provided for maintaining the sleeve in operative position.

While the apparatus as disclosed is adapted to withstand the conditions normally encountered at typical welding installations, an additional feature in order to ensure protection of the various inlet and outlets may be the provision of protective caps which are adapted to fit within the recess in the outer surface of the body means in overlying relationship to the inlet and outlets. Such protective caps may be provided with inner recesses of complementary shape to the integral body portions surrounding the inlet and outlets, to thereby provide a fluidtight seal therewith. These caps may be placed over the inlet and outlets when they are not in use, thereby preventing the entry of moisture or foreign matter.

Referring now to FIG. 7, the apparatus is identical in all respects with the device shown in FIGS. 1–3 with the exception that the reversely tapered surfaces provided in the previously described device have been modified. The inlet connector 17' is disposed within recess 23' and the shoulder 24' similar to shoulder 24 in the device shown in FIG. 1, is disposed in surrounding relationship to inlet 17'.

In contrast to the tapered surface 26 provided adjacent inlet 17 in FIG. 1, the corresponding portion of the device shown in FIG. 7 is provided with an arcuate surface 26'. The cable end adapted to cooperate with inlet connector 17' is similar in all respects with that shown in FIG. 5 with the exception that the reversely tapered surface 38 would be replaced by an arcuate outer surface complementary in configuration to that of arcuate surface 26'. This arrangement also provides a very effective fluid-tight connection between a cable end and the body means.

In a similar manner, the integral body portion 50' surrounding each of the outlets is provided with an arcuate outer surface 51'. This arcuate outer surface on each of the outlets is adapted to cooperate with a cable end as shown in FIG. 6 wherein the reversely tapered surface 68 is replaced with an arcuate surface complementary in configuration to that of arcuate surface 51'.

As pointed out previously, an important feature of the invention is the novel method of construction which permits devices of varying size and shape to be quickly and easily manufactured. Core means 11 may originally be provided as an integral block of electically conductive material. These blocks may be of considerable size, and after determining the desired finished size of the distribution device, the block of material may be cut off to the required dimensions. The recesses may then be formed in the outer faces of the core, and a central opening is formed through the core. It is evident that the size as well as the disposition of the various depressions formed in the outer faces of the core may be varied at will in accordance with the size and disposition of the inlet and outlets. The inlet and outlets are then placed within the cooperating depressions formed in the core.

The assembled core, inlet and outlets are then placed in a suitable mold, and the insulating material of the body means is then placed in the mold and molded in position such that the completed body means is provided as shown in the drawings. During this molding operation, the pair of openings 75 and 76 may be formed in alignment with the central opening in the core, or this pair of openings may subsequently be formed in the body means in a well known manner.

The insulating sleeve 80 is then inserted in position within the aligned openings in the device, and the electrical distribution device is then in completed condition.

It is apparent from the foregoing that there is provided a new and novel electrical distribution device which is especially adapted for use in constant potential multi-operator type welding systems. The device is well insulated and oil resistant, and is quite compact and rugged in construction, such that it is well adapted to withstand rough treatment and abuse as often occurs in welding operations. The device may be easily handled and lashed in operative position by the provision of the insulated opening provided therethrough which also serves as an effective cooling means to prevent overheating of the device. The device provides a central point for distributing power in many directions, and cables may be quickly and easily attached thereto or removed therefrom. The device is quite simple and inexpensive in construction, and yet is very sturdy and reliable in operation. In addition, a very simple and adaptable method is provided for constructing an electrical distribution device.

As this invention may be embodied in several forms without departing from the spirit or essential characteristic thereof, the present embodiment is therefore illustrative and not restrictive, and since the scope of the invention is defined by the appended claims, all changes that fall within the metes and bounds of the claims or that form their functional as well as conjointly cooperative equivalents are therefore intended to be embraced by those claims.

I claim:

1. An electrical distribution device comprising a unitary body means of molded electrical insulating material, a core embedded in the central portion of said body means and being formed of electrically conductive material, said core having a plurality of faces having depressions formed therein, an electrical inlet means permanently embedded in and bonded to said body means and having a portion mounted in one of said depressions, a plurality of separate electrical outlet means permanently embedded in and bonded to said body means, each of said electrical outlet means having a portion mounted within one of said depressions, each of said electrical inlet means and said electrical outlet means having a portion in communication with the outer surface of said body means, said core having an opening extending completely therethrough, said body means including openings aligned with said opening in the core, and a sleeve of electrical insulating material mounted within said aligned openings to provide an opening extending completely through said body means for facilitating handling and mounting of the device.

2. An electrical distribution device comprising an integral body means of molded electrical insulating material, the outer surface of said body means defining a plurality of faces, a core embedded within the central portion of said body means and including a plurality of outer faces, each of said faces on said core having a depression formed therein, an electrical inlet means embedded in said body means and including an inner portion fitted within one of said depressions, said electrical inlet means also including an outer portion spaced inwardly of one of the outer surfaces of said body means and being in communication therewith, said electrical inlet means being surrounded by a flexible annular shoulder, said annular shoulder having an inner surface cooperating with a surface formed on said body means to define a reversely tapered surface, a plurality of electrical outlet means embedded in said body means, each of said electrical outlet means including an inner portion fitted within one of said depressions and including an outer portion spaced inwardly of one of said faces of the body means and being in communication therewith, each of said electrical outlet means being surrounded by an integral body portion defining a reversely tapered surface, said core including an opening formed completely therethrough at the central portion thereof, said body means including a pair of openings aligned with the opening in said core and disposed on opposite sides thereof, and a sleeve of electrical insulating material disposed within said aligned openings and extending completely therethrough for providing a completely insulated opening extending entirely through said body means.

3. The method of manufacturing an electrical distribution device comprising forming a core with an opening therethrough, attaching an electrical inlet means to said core and attaching a plurality of electrical outlet means to said core, embedding said core and said electrical inlet means and said electrical outlet means in a body of electrical insulating material, forming openings in said body aligned with the opening in said core, and inserting a sleeve of electrically non-conductive material in said aligned openings.

4. The method of manufacturing an electrical distribution device comprising forming a core of predetermined length and having a plurality of outer faces, forming a depression in each of said faces, forming an opening completely through said core, fitting an electrical inlet means in one of said depressions, fitting an electrical outlet means in each of the other depressions, molding an integral body of electrical insulating material in surrounding relationship to said core and said electrical inlet means and said electrical outlet means, forming a pair of aligned openings in said body means in alignment with the opening in said core and on opposite sides of the core, and inserting a sleeve of electrical insulating material through said aligned openings.

5. An electrical distribution device comprising an integral body means of molded electrical insulating material, the outer surface of said body means defining a plurality of faces, a core comprising a substantially solid block of electrically conductive material embedded within the central portion of said body means, an electrical inlet means permanently embedded in and bonded to the insulating material of said body means and having an inner portion electrically connected with said core, said electrical inlet means also including an outer end portion spaced inwardly of one of the outer faces of said body means and being in communication therewith, said body means including a substantially cup-shaped recess formed in said one outer face of said body means in surrounding relationship to said electrical inlet means, said body means including an integral relatively thin flexible annular shoulder member spaced from the inner wall of said cup-shaped recess, the outer end of said shoulder being spaced inwardly of the outer end portion of said electrical inlet means, said shoulder being disposed in surrounding spaced relationship to said electrical inlet means, the inner surface of said shoulder member being a sloping surface, said body means defining a sloping surface joining said last-mentioned surface, said two sloping surfaces cooperating to define a reversely tapered surface for receiving a corresponding tapered member and providing a fluid-tight interconnection therewith, said reversely tapered surface having a maximum cross-sectional dimension at the juncture of said two sloping surfaces, a plurality of separate electrical outlet means permanently embedded in and bonded to the insulating material of said body means, each of said electrical outlet means including an inner end portion electrically connected to said core and an outer end portion spaced inwardly of one of the outer faces of said body means and being in communication therewith, said body means including a substantially cup-shaped recess formed in some of the outer faces thereof in surrounding relationship to each of said electrical outlet means, each of said electrical outlet means being surrounded by an integral body portion defining on the outer surface thereof a reversely tapered annular surface disposed in spaced relationship from the inner wall of the associated cup-shaped recess, the integral body portion surrounding each of said electrical outlet means extending outwardly of the outer end portion of the associated electrical outlet means and having the outer end thereof disposed in substantially the same plane as the associated face of the body means.

6. An electrical distribution device comprising an integral body means of molded electrical insulating material, the outer surface of said body means defining a plurality of faces being offset angularly with respect to one another, a core comprising a substantially solid block of electrically conductive material defining a plurality of faces in spaced substantially parallel relationship with some of said faces formed on the outer surface of said body means, each of said faces on said core having a depression formed therein, said core being embedded within the central portion of said body means and having an opening formed completely through the central portion thereof, an electrical inlet means permanently embedded in and bonded to the insulating material of said body means and having an inner end portion fitted within one of said depressions, said electrical inlet means also including an outer end portion spaced inwardly of one of the outer faces of said body means and being in communication therewith, said body means including a substantially cup-shaped recess formed in said last-mentioned outer face in surrounding relationship to said electrical inlet means, said body means also including an integral relatively thin flexible annular shoulder member spaced from the inner wall of said cup-shaped recess, the outer end of said shoulder being spaced inwardly of the outer end portion of said electrical inlet means, said shoulder being disposed in surrounding spaced relationship to said electrical inlet means, the inner surface of said shoulder member being a sloping surface, said body means defining a sloping surface joining said last-mentioned surface, said two sloping surfaces cooperating to define a reversely tapered surface for receiving a correspondingly tapered member and providing a fluid-tight interconnection therewith, said reversely tapered surface having a maximum cross-sectional dimension at the juncture of said two sloping surfaces, a plurality of separate electrical outlet means permanently embedded in and bonded to the insulating material of said body means, each of said electrical outlet means including an inner end portion fitted within one of said depressions and including an outer end portion spaced inwardly of one of said outer faces of said body means and being in communication therewith, said body means including a substantially cup-shaped recess formed in some of the outer faces thereof in surrounding relationship to each of said electrical outlet means, each of said electrical outlet means being surrounded by an integral body portion defining on the outer surface thereof a reversely tapered annular surface disposed in spaced relationship from the inner wall of the associated cup-shaped recess, the integral body portion surrounding each of said electrical outlet means extending outwardly of the outer end portion of the associated electrical outlet means and having the outer end thereof disposed in substantially the same plane as the associated face of the body means, said body means including a pair of openings on opposite sides of said core and in alignment with the opening through said core, and a sleeve of electrical insulating material disposed within said aligned openings and extending completely therethrough for providing a completely insulated opening extending entirely through said body means and core.

7. An electrical distribution device comprising a body means formed of electrical insulating material, an electrically conductive core embedded in the central portion of said body means, said core having a plurality of faces, each of said faces having at least one depression formed therein, a separate electrical inlet means permanently embedded in and bonded to the insulating material of said body means and being in communication with the outer surface of said body means, said electrical inlet means including a portion fitted within one of the said depressions, a plurality of separate electrical outlet means permanently embedded in and bonded to the insulating material of said body means and being in communication with the outer surface of said body means, each of said electrical outlet means including a portion fitted within one of said depressions, whereby said electrical inlet means and each of said outlet means are permanently electrically connected to one another, said inlet means and said outlet means being spaced inwardly of the outer surface of said body means to protect said inlet means and said outlet means from damage, said body means including a substantially cup-shaped recess formed in the outer surface thereof in surrounding relationship to said electrical inlet means, said body means also including an integral relatively thin flexible annular shoulder member spaced from the inner wall of said cup-shaped recess and disposed in surrounding spaced relationship to said electrical inlet means.

8. Apparatus as defined in claim 7, wherein the inner surface of said shoulder member is a sloping surface, said body means defining a sloping surface joining said last mentioned surface, said two sloping surfaces cooperating to define a reversely tapered surface for receiving a corresponingly tapered member and providing a fluid-tight interconnection therewith.

References Cited in the file of this patent

UNITED STATES PATENTS

| 2,006,436 | Bowers | July 2, 1935 |
| 2,087,384 | Lee | July 20, 1937 |
| 2,677,115 | Stevens | Apr. 27, 1954 |
| 2,742,622 | Stevens | Apr. 17, 1956 |
| 2,823,249 | Curtiss | Feb. 11, 1958 |
| 2,907,973 | Stevens | Oct. 6, 1959 |
| 2,917,724 | Jackson | Dec. 15, 1959 |